(12) United States Patent
Folkesson et al.

(10) Patent No.: US 12,129,914 B2
(45) Date of Patent: *Oct. 29, 2024

(54) TRANSMISSION, A POWERTRAIN AND A VEHICLE

(71) Applicant: Volvo Truck Corporation, Gothenburg (SE)

(72) Inventors: Johan Folkesson, Skene (SE); Anders Hedman, Marstrand (SE); Sven Norberg, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 119 days.

This patent is subject to a terminal disclaimer.

(21) Appl. No.: 17/982,605

(22) Filed: Nov. 8, 2022

(65) Prior Publication Data

US 2023/0175578 A1 Jun. 8, 2023

(30) Foreign Application Priority Data

Dec. 2, 2021 (EP) .................................... 21212008

(51) Int. Cl.
*F16H 37/06* (2006.01)
*B60K 1/02* (2006.01)
(Continued)

(52) U.S. Cl.
CPC ............. *F16H 37/065* (2013.01); *B60K 1/02* (2013.01); *B60K 17/08* (2013.01); *B60K 17/28* (2013.01);
(Continued)

(58) Field of Classification Search
CPC .......... F16H 37/065; F16H 2200/0021; F16H 3/093; F16H 2003/0826; F16H 2057/0216;
(Continued)

(56) References Cited

U.S. PATENT DOCUMENTS

| | | | |
|---|---|---|---|
| 2011/0245028 A1 | 10/2011 | Kraynev et al. | |
| 2015/0126321 A1* | 5/2015 | Mittelberger | F16H 37/042 74/331 |
| 2023/0313865 A1* | 10/2023 | Hedman | B60K 1/02 74/331 |

FOREIGN PATENT DOCUMENTS

| | | | | |
|---|---|---|---|---|
| CN | 110088503 A | * | 8/2019 | ............. F16H 3/006 |
| DE | 102011005028 A1 | * | 9/2012 | ............... B60K 6/48 |

(Continued)

OTHER PUBLICATIONS

Extended European Search Report, 21212008.3, mailed May 3, 2022, 7 pages.

*Primary Examiner* — Justin Holmes
(74) *Attorney, Agent, or Firm* — Sage Patent Group

(57) ABSTRACT

A vehicle transmission includes:
a first and second input shaft (IS), a countershaft, a main shaft, and an output shaft,
a first gear plane (GP) comprising a first IS gearwheel (ISG), a first main gearwheel (MG), and a first countershaft gearwheel (CG),
a second GP comprising a second ISG, a second MG, and a second CG, the first
CG connectable to the second CG,
a range gear comprising at least a first, second, and third range gear component (RGC), the first RGC connected to the output shaft,
a first gear engaging device (GED) settable to:
a state connecting the first MG to the first RGC,
a neutral state, and
a state connecting the first MG to the second RGC,
a second GED settable to at least:
a state connecting the second MG to the second RGC,
a neutral state.

18 Claims, 13 Drawing Sheets

(51) Int. Cl.
  *B60K 17/08* (2006.01)
  *B60K 17/28* (2006.01)
  *B60K 25/06* (2006.01)

(52) U.S. Cl.
  CPC ...... *B60K 25/06* (2013.01); *F16H 2200/0021* (2013.01)

(58) Field of Classification Search
  CPC .. F16H 2200/0004; F16H 37/046; F16H 3/70; F16H 3/724; F16H 57/023; F16H 57/082; F16H 2200/2005; B60K 1/02; B60K 17/08; B60K 17/28; B60K 25/06; B60K 17/02; B60K 17/06; B60Y 2200/142; B60Y 2200/91
  See application file for complete search history.

(56) References Cited

FOREIGN PATENT DOCUMENTS

| | | | | |
|---|---|---|---|---|
| EP | 2149725 B1 | * | 5/2012 | ............. F16H 3/006 |
| EP | 3 171 053 A1 | | 5/2017 | |
| WO | 2021/073748 A1 | | 4/2021 | |

\* cited by examiner

US 12,129,914 B2

TRANSMISSION, A POWERTRAIN AND A VEHICLE

CROSS REFERENCE TO RELATED APPLICATIONS

This application claims priority to European Patent Application No. 21212008.3 filed on Dec. 2, 2021, the disclosure and content of which is incorporated by reference herein in its entirety.

TECHNICAL FIELD

The invention relates to a transmission, a powertrain and a vehicle.

The invention can be applied in heavy-duty vehicles, such as trucks, buses, and construction equipment. Although the invention will be described with respect to a truck, the invention is not restricted to this type of vehicle, but may also be used in other vehicles such as buses, trailers, wheel loaders, excavators, etc.

BACKGROUND

Electrically or partly electrically operated heavy-duty vehicles are becoming increasingly common. For heavy-duty vehicles, it may be desirable to provide more than one electric machine for propulsion of the vehicle, and also to provide electric power to auxiliary systems and for power take-off. In such powertrains including two propulsion units, a common transmission may be provided, transmitting torque from each one of the electric machines to a common output shaft used to propel a driven axle of the vehicle.

US 2009/0019967 discloses a powertrain including two electric machines and a common transmission for torque transmission from each of the electric machines to a common output shaft for driving the vehicle. Each electric machine is connected to a corresponding input shaft, on which input gearwheels are provided for selective transmission of torque via corresponding output gearwheels provided on the common output shaft.

There is an ongoing strive to improve the powertrains of electrically operated vehicles and combine powertrain efficiency with a broad power range.

SUMMARY

A primary object of the present disclosure is to provide an in at least some aspect improved transmission suitable for a powertrain comprising two power units, such as two electric machines.

According to a first aspect of the present disclosure, the above object is achieved by a transmission for a vehicle according to claim 1. The transmission comprises:
- a first input shaft, a second input shaft, a countershaft, a main shaft, and an output shaft,
- a first gear plane comprising a first input shaft gearwheel arranged on the first input shaft, a first main gearwheel rotatably arranged on the main shaft, and a first countershaft gearwheel arranged on the countershaft, the gearwheels of the first gearwheel plane being arranged in mutual driving connection,
- a second gear plane comprising a second input shaft gearwheel arranged on the second input shaft, a second main gearwheel rotatably arranged on the main shaft or on the output shaft, and a second countershaft gearwheel arranged on the countershaft, the first countershaft gearwheel being selectively drivingly connectable to the second countershaft gearwheel, the gearwheels of the second gearwheel plane being arranged in mutual driving connection,
- a range gear selectively settable to a high range gear or a low range gear, the range gear comprising at least a first, a second and a third range gear component, the first range gear component being rotationally connected to the output shaft,
- a first gear engaging device selectively settable to:
  - a first gear engaging device first state in which it drivingly connects the first main gearwheel to the first range gear component,
  - a first gear engaging device neutral state, and
  - a first gear engaging device second state in which it drivingly connects the first main gearwheel to the second range gear component,
- a second gear engaging device selectively settable to at least:
  - a second gear engaging device first state in which it drivingly connects the second main gearwheel to the second range gear component,
  - a second gear engaging device neutral state.

The transmission disclosed herein is able to provide at least eight different gear ratios using merely two gear planes and a range gear. The transmission thereby becomes robust and compact, while it also fulfils high demands on torque capacity and efficiency. It can furthermore be used to transmit torque from two different power units to the driven wheels of a vehicle, either from one at a time or from both simultaneously. The transmission also allows uninterrupted torque transmission during acceleration and deceleration of the vehicle using two power units, since one of the input shafts can always be used for torque transfer while the other one is disconnected for gear changing.

Since the transmission comprises two separate gear planes, and selectively drivingly connectable countershaft gearwheels, reduced gear mesh loads can be achieved. In particular, during start-off and/or crawling of the vehicle, gear mesh loads may be reduced by setting the first gear engaging device to the first gear engaging device second state and the second gear engaging device to the second gear engaging device neutral state. The selectively drivingly connectable countershaft gearwheels further enable a winding power flow.

The gearwheels of each gearwheel plane are arranged in mutual driving connection, such as by the input shaft gearwheels being in meshing engagement with the respective main gearwheels, in turn being in meshing engagement with the respective countershaft gearwheel. It may also be possible to provide an intermediate shaft with gearwheels via which the driving connection is achieved by meshing engagement.

The first countershaft gearwheel is selectively drivingly connectable to the second countershaft gearwheel, such as by selectively rotationally connecting the second countershaft gearwheel to the countershaft. In this case, the first countershaft gearwheel may be permanently fixed for common rotation with the countershaft, while the second countershaft gearwheel is rotatably arranged on the countershaft and is selectively rotationally connectable therewith by means of the countershaft gear engaging device.

By the term "rotationally connect to" is intended "connect for common rotation with". For example, in the first gear engaging device first state, the first gear engaging device connects the first main gearwheel for common rotation with the first range gear component around a common axis of rotation.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

By a meshing engagement is intended a permanent meshing engagement if nothing else is mentioned.

In embodiments described herein, the range gear is preferably located closer to the first gear plane than to the second gear plane. The first gear plane may be located at a first distance and the second gear plane at a second distance from the range gear along the longitudinal axis, respectively, the second distance being larger than the first.

Optionally, the second main gearwheel is rotatably arranged on the output shaft, and the second gear engaging device is further selectively settable to a second gear engaging device second state in which it rotationally connects the second main gearwheel to the output shaft. In the second gear engaging device second state, torque from a second power unit connected to the second input shaft is hereby transmittable to the output shaft via only the second input shaft, the second input shaft gearwheel, and the second main gearwheel. This enables torque from the second power unit to bypass the range gear, which is useful to prevent false brinelling in the range gear, in particular when the second range gear component is a sun gearwheel of a planetary gear set.

Optionally, the main shaft is a hollow shaft being rotatably arranged on and coaxial with the output shaft. This is particularly applicable in combination with the second main gearwheel being rotatably arranged on the output shaft. In the first gear plane, the first main gearwheel is herein rotatably arranged on the main shaft, which is in turn rotatably arranged on the output shaft. The second gear plane is herein offset from the main shaft along the longitudinal axis.

Optionally, the second main gearwheel is rotatably arranged on the main shaft, the main shaft and the output shaft being arranged in a row along a common longitudinal axis. Thus, the main shaft is in this configuration not a hollow shaft rotatably arranged on the output shaft. Instead, the main shaft and the output shaft are arranged consecutively along the longitudinal axis, with both the first and the second main gearwheel being arranged on the main shaft. By doing so, a less complicated configuration of the main shaft and the output shaft is achieved, in particular when the output shaft is not provided on the same side as the power units. The second gear engaging device can in this embodiment not be used for rotationally connecting the second main gearwheel to the output shaft.

Optionally, the first input shaft gearwheel may be permanently fixed to the first input shaft, and the second input shaft gearwheel may be permanently fixed to the second input shaft. This improves the robustness of the transmission since no clutch or similar is necessary for fixing the first and/or the second gearwheel/s to the respective input shaft/s.

Optionally, the range gear comprises a planetary gear set, i.e., a gear set comprising a ring gearwheel, a planetary gearwheel carrier carrying a plurality of planetary gearwheels, and a sun gearwheel. A compact configuration of the transmission can thereby be achieved.

Optionally, the transmission further comprises a range gear selector configured to set the range gear to the low range gear by locking the third range gear component to a transmission housing, and to set the range gear to the high range gear by rotationally connecting at least two of the first, second and third range gear components. Thus, in the low range gear, the range gear components are allowed to rotate relative one another. In the high range gear, the range gear components are allowed to rotate with respect to the housing, but not relative one another. The range gear herein preferably comprises a planetary gear set.

Optionally, the third range gear component is a ring gearwheel of the planetary gear set. The ring gearwheel may easily be locked to the transmission housing by the range gear selector. Preferably, the first range gear component may be a planetary gearwheel carrier and the second range gear component may be a sun gearwheel of the planetary gear set. This is a robust and space efficient configuration.

Optionally, the transmission further comprises a countershaft gear engaging device for selectively rotationally connecting the second countershaft gearwheel to the countershaft, thereby selectively drivingly connecting the first countershaft gearwheel to the second countershaft gearwheel. Herein, the first countershaft gearwheel may be permanently fixed to the countershaft, while the second countershaft gearwheel is rotatably arranged on the countershaft and selectively connectable for common rotation therewith by means of the countershaft gear engaging device. This is particularly useful when the second countershaft gearwheel has a larger diameter than the first countershaft gearwheel. Of course, it would alternatively be possible to selectively rotationally connect the first countershaft gearwheel to the countershaft, the second countershaft gearwheel being permanently fixed to the countershaft.

Optionally, the first input shaft gearwheel and the first main gearwheel of the first gear plane provide a larger gear ratio than the second input shaft gearwheel and the second main gearwheel of the second gear plane. This enables an efficient gear shifting sequence with uninterrupted torque transfer when accelerating a vehicle from a stand-still. When the transmission is connected to two power units, the second gear plane is preferably located closer to the power units than the first gear plane, the first gear plane being located closer to the range gear than the second gear plane.

Optionally, the first main gearwheel is arranged in meshing engagement with each one of the first input shaft gearwheel and the first countershaft gearwheel, and the second main gearwheel is arranged in meshing engagement with each one of the second input shaft gearwheel and the first countershaft gearwheel. This provides a compact configuration with no additional shaft and thereby reduced frictional losses.

Optionally, the main shaft is rotationally fixed to the second range gear component. Thus, by rotationally connecting the first and/or second main gearwheel to the main shaft, torque is transmittable via the main shaft and at least the second range gear component of the range gear to the output shaft. The main shaft may in this configuration be either hollow or non-hollow.

Optionally, the second gear engaging device is configured to drivingly connect the second main gearwheel to the main shaft in the second gear engaging device first state.

Optionally, the first gear engaging device is configured to drivingly connect the first main gearwheel to the main shaft in the first gear engaging device second state.

Optionally, the second gear plane further comprises a first input shaft second gearwheel rotatably arranged on the first input shaft and the transmission further comprises a third gear engaging device for selectively rotationally connecting the first input shaft second gearwheel to the first input shaft. The first input shaft second gearwheel may herein be arranged in meshing engagement with the second main gearwheel. With the additional first input shaft second gearwheel, efficiency losses can be reduced. This is particularly useful for high-speed operation of the vehicle, wherein torque may be transmitted from both power units to the output shaft via the second gear plane, without using the range gear.

According to a second aspect of the invention, at least the primary object is also achieved by a powertrain according to claim 15. The powertrain comprises a first power unit, a second power unit and the transmission according to the first aspect of the invention, wherein the first input shaft of the transmission is drivingly connected to the first power unit and wherein the second input shaft of the transmission is drivingly connected to the second power unit. Advantages and advantageous features of the powertrain according to the invention appear from the above description of the first aspect of the invention.

Optionally, at least one of the first power unit and the second power unit is an electric machine. Both power units may be electric machines of the same type or of different types. At least one of the power units may alternatively be an internal combustion engine.

Optionally, the powertrain further comprises a power take-off (PTO) device drivingly connected or connectable to the countershaft. The PTO device may herein be driven independently of the vehicle speed since power from the second power unit can be used for propulsion of the vehicle while power from the first power unit is used for driving the PTO device. This may be achieved by setting the first gear engaging device to the first gear engaging device neutral state, and the second gear engaging device to the second gear engaging device first or, if applicable, second state, and the countershaft gear engaging device to a disengaged state in which the countershaft gearwheels are not drivingly connected.

The power take-off device may comprise a selectively engageable clutch for drivingly connecting the power take-off device to the countershaft. By means of the clutch, it is possible to disconnect the PTO device from the countershaft and thereby use torque from both of the power units for driving the propeller shaft without driving the PTO device.

Optionally, the clutch is a tooth clutch. When the vehicle is in motion and propelled solely by the second power unit, the tooth clutch can be engaged by controlling the first power unit to a low or zero rotational speed.

According to a third aspect of the present disclosure, at least the primary object is also achieved by a vehicle comprising a powertrain according to the second aspect. The vehicle may for example be a fully electrified vehicle, or a hybrid vehicle comprising also at least one internal combustion engine in addition to the first and second electric machines. Advantages and advantageous features of the vehicle according to the present disclosure appear from the above description of the first and second aspects of the present disclosure.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

Figure 1:
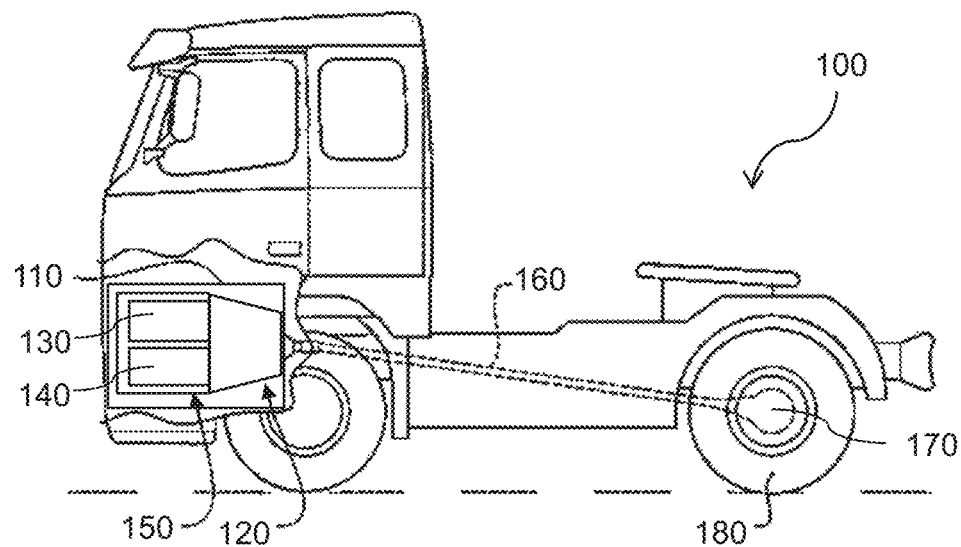
FIG. 1 schematically illustrates a vehicle according to an embodiment of the present disclosure, FIG. 2 schematically illustrates a transmission according to a first embodiment.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION

A vehicle 100 in the form of a truck according to an embodiment of the present disclosure is schematically shown in FIG. 1. The vehicle 100 includes a powertrain 110 with a power unit assembly 150 for propulsion of the vehicle 100. The power unit assembly 150 comprises at least two power units 130, 140 in the form of electric machines 130, 140 connected to a transmission 120 and configured to be powered by an electric energy storage system (not shown) of the vehicle 100. The transmission 120 is arranged to transfer torque from the power unit assembly 150 to a propeller shaft 160 connecting the transmission 120 to a driven axle 170 that drives driven wheels 180 of the vehicle 100. The vehicle may further comprise a power take-off (PTO) device (not shown).

Thus, in the shown embodiment, the vehicle 100 is a fully electrified vehicle configured to be driven solely by the power unit assembly 150. The vehicle 100 may be arranged with more than one driven axle, such as two or more driven axles. The power unit assembly 150 of the vehicle 100 may comprise more than two electric machines, such as three or four electric machines. The vehicle may also be a hybrid vehicle, provided with an internal combustion engine in addition to the electric machines 130, 140. The electric machines 130, 140 may be in the form of electric motors/generators.

Of course, the vehicle and the powertrain may have many different configurations. By way of example, the electric machine assembly 150 and the transmission 120 do not need to be provided at a front of the vehicle, but may, e.g., be combined with a rear axle of the vehicle.

Figure 2:
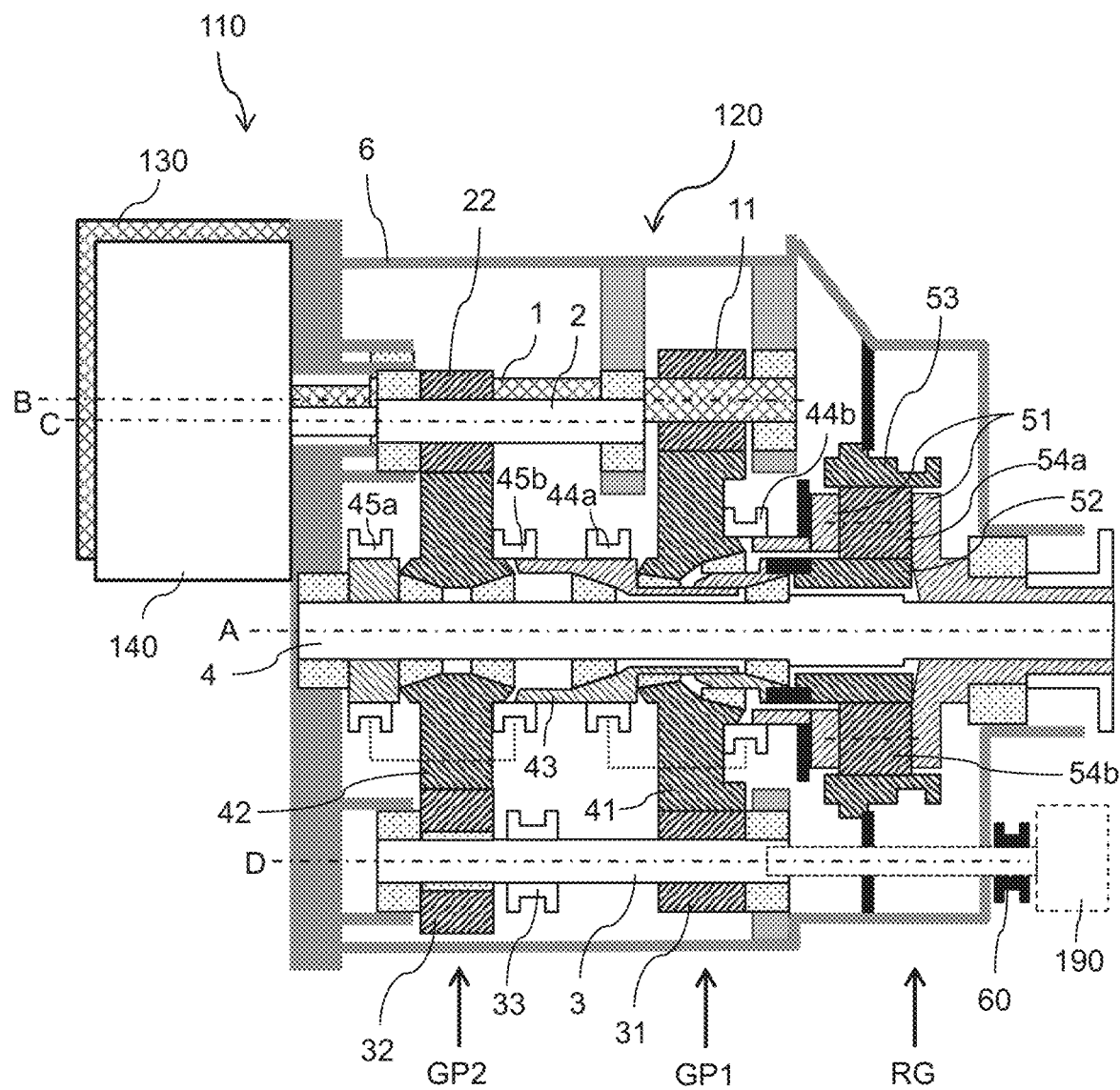

FIG. 2 illustrates parts of a powertrain 110 including a transmission 120 according to a first embodiment of the present disclosure. The powertrain 110 further comprises a first electric machine 130, a second electric machine 140, and an optional power take-off (PTO) device 190. The transmission 120 comprises a first input shaft 1 drivingly connected to the first electric machine 130 and a second input shaft 2 drivingly connected to the second electric machine 140. The transmission 120 further comprises an output shaft 4 configured to be drivingly connected to the propeller shaft 160 of the vehicle 100, a hollow main shaft 43, and a countershaft 3, which is herein drivingly connectable to the PTO device 190 via a clutch 60. The shafts 1, 2, 3, 4, 43 are mounted to a transmission housing 6 using bearings, shown as dotted areas in the figures. The shafts 1, 2, 3, 4, 43 are herein parallel shafts, with the output shaft 4 and the main shaft 43 extending along a longitudinal axis A. The main shaft 43 is herein rotatably arranged on and coaxial with the output shaft 4. The first input shaft 1 extends along a longitudinal axis B, the second input shaft 2 extends along a longitudinal axis C, and the countershaft 3 extends along a longitudinal axis D. When viewed from a viewpoint located along, e.g., the axis A, the axes A, B, and C will in the illustrated embodiment form the corners of an assumed triangle, although this is not necessary. The electric machines, and consequently also the input shafts, may alternatively be coaxially arranged. The axes A, B and C may also extend in a common plane, offset from one another.

A first gear plane GP1 of the transmission 120 comprises a first input shaft gearwheel 11 arranged on the first input shaft 1, a first main gearwheel 41 rotatably arranged on the main shaft 43, and a first countershaft gearwheel 31 arranged on the countershaft 3. Bearings, shown as dotted areas in the figures, are provided between the hollow main shaft 43 and the output shaft 4, and between the first main gearwheel 41 and the main shaft 43. The gearwheels 11, 31, 41 of the first gearwheel plane GP1 are arranged in mutual driving connection, namely by the first main gearwheel 41 being arranged in meshing engagement with each one of the first input shaft gearwheel 11 and the first countershaft gearwheel 31. The first input shaft gearwheel 11 is herein permanently fixed for common rotation with the first input shaft 1 and the first countershaft gearwheel 31 is permanently fixed for common rotation with the countershaft 31. The first gear plane GP1 extends perpendicularly to the axes A, B, C, D.

A second gear plane GP2 comprises a second input shaft gearwheel 22 arranged on the second input shaft 2, a second main gearwheel 42 rotatably arranged on the output shaft 4, and a second countershaft gearwheel 32 rotatably arranged on the countershaft 3. Bearings, shown as dotted areas in the figures, are provided between the second main gearwheel 42 and the output shaft 4, as well as between the second countershaft gearwheel 32 and the countershaft 3. The first countershaft gearwheel 31 is selectively drivingly connectable to the second countershaft gearwheel 32 by means of a countershaft gear engaging device 33. The countershaft gear engaging device 33 is for this purpose arranged to selectively fix the second countershaft gearwheel 32 for common rotation with the countershaft 3 in an engaged state of the countershaft gear engaging device 33. In a disengaged state of the countershaft gear engaging device 33, the second countershaft gearwheel 32 is rotatable with respect to the countershaft 3. The gearwheels 22, 32, 42 of the second gearwheel plane GP2 are arranged in mutual driving connection, namely by the second main gearwheel 42 being arranged in meshing engagement with each one of the second input shaft gearwheel 22 and the second countershaft gearwheel 32. The second input shaft gearwheel 22 is herein permanently fixed for common rotation with the second input shaft 2. The second gear plane GP2 extends perpendicularly to the axes A, B, C, D.

A range gear RG is further provided, which is selectively settable to a high range gear or a low range gear. The range gear RG comprises at least a first, a second and a third range gear component 51, 52, 53, the first range gear component 51 being rotationally connected to the output shaft 4. In the present embodiment, the range gear RG comprises a planetary gear set, the first range gear component 51 being a planetary gearwheel carrier 51 carrying a plurality of planetary gearwheels 54a, 54b. The second range gear component 52 is a sun gearwheel 52, and the third range gear component 53 is a ring gearwheel 53.

A first gear engaging device 44a, 44b of the transmission 120 is provided. The first gear engaging device herein comprises two sleeve members 44a, 44b, that may be actuated simultaneously by means of an actuator (not shown). The first gear engaging device 44a, 44b is selectively settable to one of:

a first gear engaging device first state, in which it drivingly connects the first main gearwheel 41 to the first range gear component 51, i.e., the planetary gearwheel carrier 51, a first gear engaging device neutral state, in which the first gear engaging device allows the first main gearwheel 41 to rotate with respect to the first and second range gear components 51, 52, and a first gear engaging device second state, in which it drivingly connects the first main gearwheel 41 to the second range gear component 52.

A second gear engaging device 45a, 45b is further provided. The second gear engaging device herein comprises two sleeve members 45a, 45b, that may be actuated simultaneously by means of an actuator (not shown). The second gear engaging device 45a, 45b is selectively settable to one of:

a second gear engaging device first state, in which it drivingly connects the second main gearwheel 42 to the second range gear component 52, i.e., the sun gearwheel 52, a second gear engaging device neutral state, in which the second gear engaging device allows the second main gearwheel 42 to rotate with respect to the output shaft 4 and the second range gear component 52, and a second gear engaging device second state, in which it rotationally connects the second main gearwheel 42 to the output shaft 4.

The sleeve members 44a, 44b, 45a, 45b may, e.g., be referred to as clutch sleeves, clutch collars, engaging sleeves, or similar. Shift forks (not shown) may be provided for moving the sleeve members 44a, 44b, 45a, 45b so as to change gears. Gear shifting may be controlled from a transmission control unit (not shown) using, e.g., electric, hydraulic, or pneumatic actuators to move the shift forks.

The main shaft 43 is rotationally fixed to the second range gear component 52, i.e., the sun gearwheel 52, and may be regarded as an axial extension of the sun gearwheel 52 along the longitudinal axis A. Thus, the second gear engaging device first state is achieved by rotationally connecting the second main gearwheel 42 to the main shaft 43, which in turn is permanently fixed to the second range gear component 52.

The range gear RG is settable to the low range gear by locking the third range gear component 53, i.e., the ring gearwheel 53, to the transmission housing 6. It is further settable to the high range gear by rotationally connecting at least two of the first, second and third range gear components 51, 52, 53, thereby allowing the range gear components 51, 52, 53 to rotate with respect to the transmission housing 6, but not relative one another. Any two of the first, second and third range gear components 51, 52, 53 may be rotationally connected for this purpose, but in the shown embodiment, this is achieved by moving the ring gearwheel 53 to the left, thereby releasing it from the transmission housing 6 and fixing it to the planetary gearwheel carrier 51. A range gear selector (not shown) is provided for this purpose.

The transmission 120 is herein arranged so that the first input shaft gearwheel 11 and the first main gearwheel 41 of the first gear plane GP1 provide a larger gear ratio than the second input shaft gearwheel 22 and the second main gearwheel 42 of the second gear plane GP2. Furthermore, the second countershaft gearwheel 32 has a larger diameter than the first countershaft gearwheel 31, and the first main gearwheel 41 has a larger diameter than the second main gearwheel 42. The different diameters are indicative of different number of teeth on the respective gearwheels. The second gear plane GP2 is arranged closer to the electric machines 130, 140 than the first gear plane GP1, which is located closer to the range gear RG.

FIGS. 3-9 illustrate the power flows in a gear shifting sequence using the transmission 120 according to the first embodiment for starting and accelerating a vehicle 100. As will be seen, an uninterrupted power flow is provided during the entire gear shifting sequence. The power flows are illustrated as dotted arrows in the figures.

Figure 3:
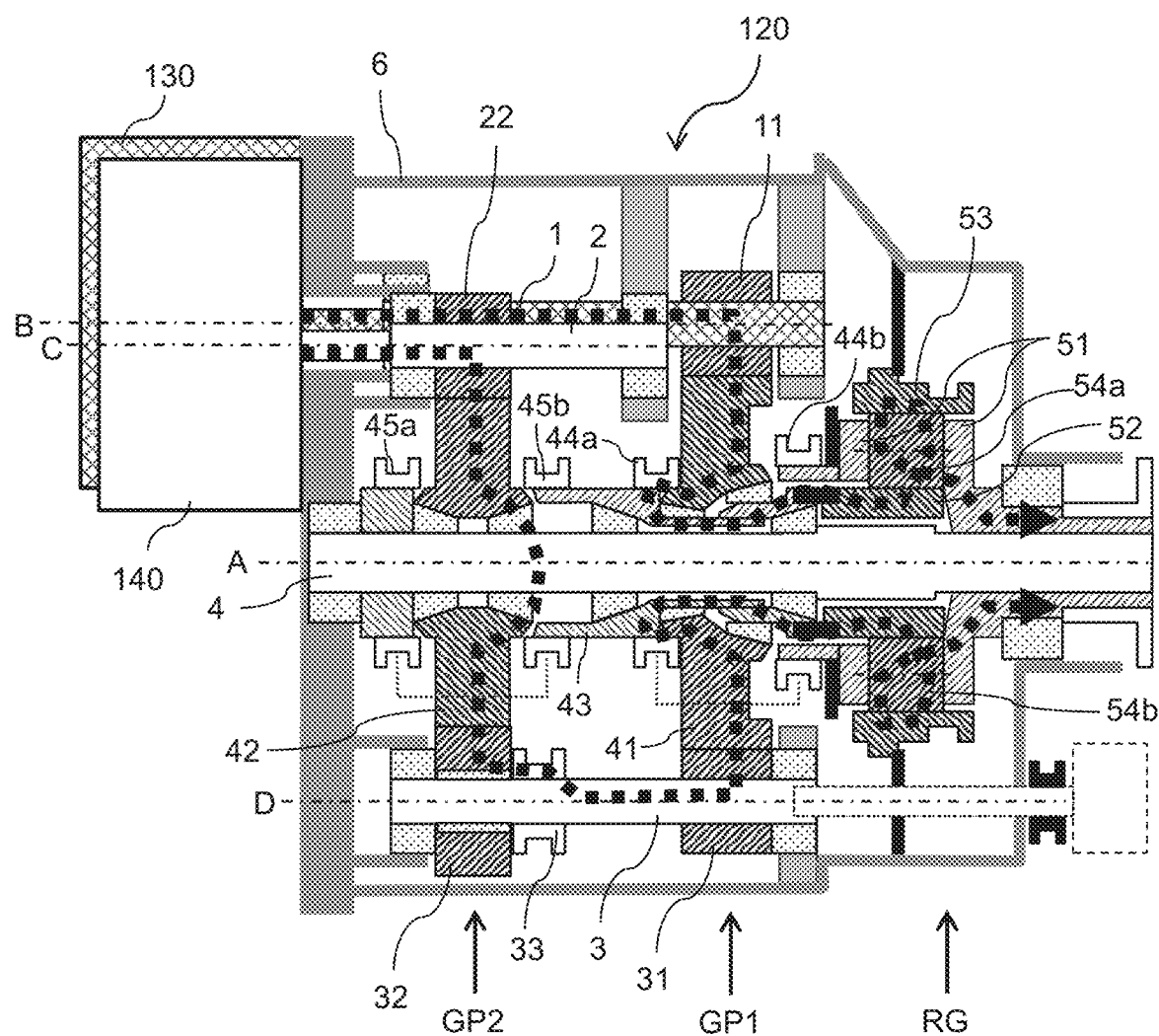
FIG. 3 illustrates power flow through the transmission in FIG. 2 in a first state.

In FIG. 3, the transmission 120 is in a starting configuration with the first gear engaging device 44a, 44b set to the first gear engaging device second state and the second gear engaging device 45a, 45b set to the second gear engaging device neutral state. The countershaft gear engaging device 33 is set to connect the second countershaft gearwheel 32 for common rotation with the countershaft 3. The range gear RG is set to the low range gear by fixing the ring gearwheel 53 to the transmission housing 6. Thereby, the first electric machine 130 is drivingly connected to the output shaft 4 via the first gear plane GP1, the sun gearwheel 52, and the planetary gearwheel carrier 51. The second electric machine 140 is drivingly connected to the output shaft 4 via the countershaft 3 and the first gear plane GP1. Both electric machines 130, 140 may thus be used for propulsion of the vehicle 100 at low vehicle speeds, but with different gear meshes used for torque transmission from the respective electric machines 130, 140, contributing to reduced gear mesh loads.

When the vehicle speed is increased, the countershaft gear engaging device 33 may be disengaged while the second gear engaging device 45a, 45b remains set to the second gear engaging device neutral state, so that torque transfer from the second electric machine 140 to the output shaft 4 is temporarily interrupted. The range gear RG is still set to the low range gear and the first gear engaging device 44a, 44b remains in the first gear engaging device second state. The first electric machine 130 now solely drives the vehicle 100 during shifting of the second gear engaging device 45a, 45b to the second gear engaging device first state.

Figure 4:
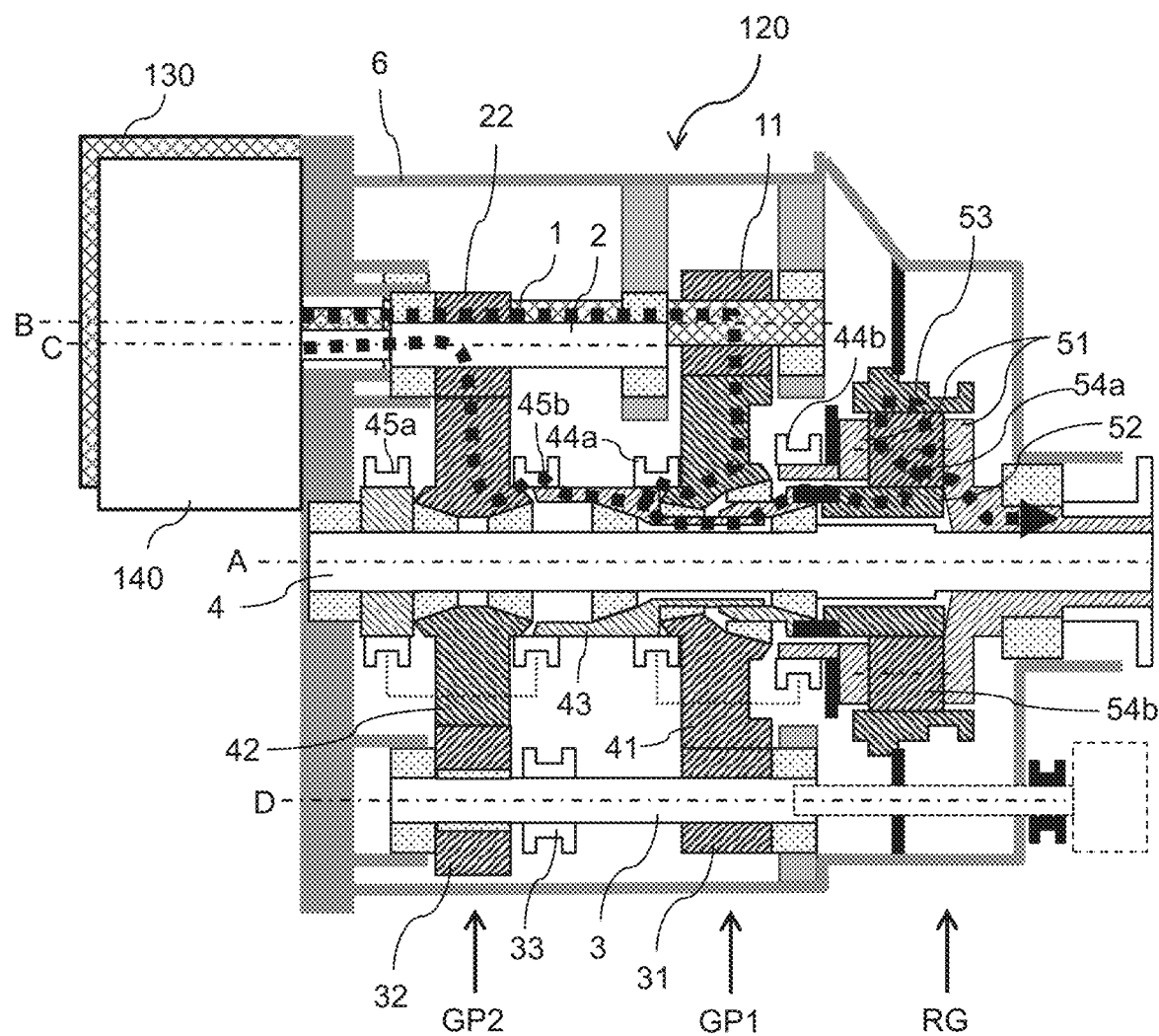
FIG. 4 illustrates power flow through the transmission in FIG. 2 in a second state.

In FIG. 4, the second gear engaging device 45a, 45b has been shifted to the second gear engaging device first state, while the first gear engaging device 44a, 44b remains in the first gear engaging device second state, the countershaft gear engaging device 33 is disengaged, and the range gear RG is set to the low range gear. Torque from the second electric machine 140 is thereby transferred via the second main gearwheel 42 and the main shaft 43 to the range gear RG as illustrated by the dotted arrow. In this configuration, there is no torque transfer via the countershaft 3.

When the vehicle speed is further increased, the first gear engaging device 44a, 44b is shifted to the first gear engaging device neutral state to interrupt torque transfer from the first electric machine 130 and let the second electric machine 140 drive the vehicle 100 during shifting of the countershaft gear engaging device 33 to rotationally connect the second countershaft gearwheel 32 to the countershaft 3.

Figure 5:
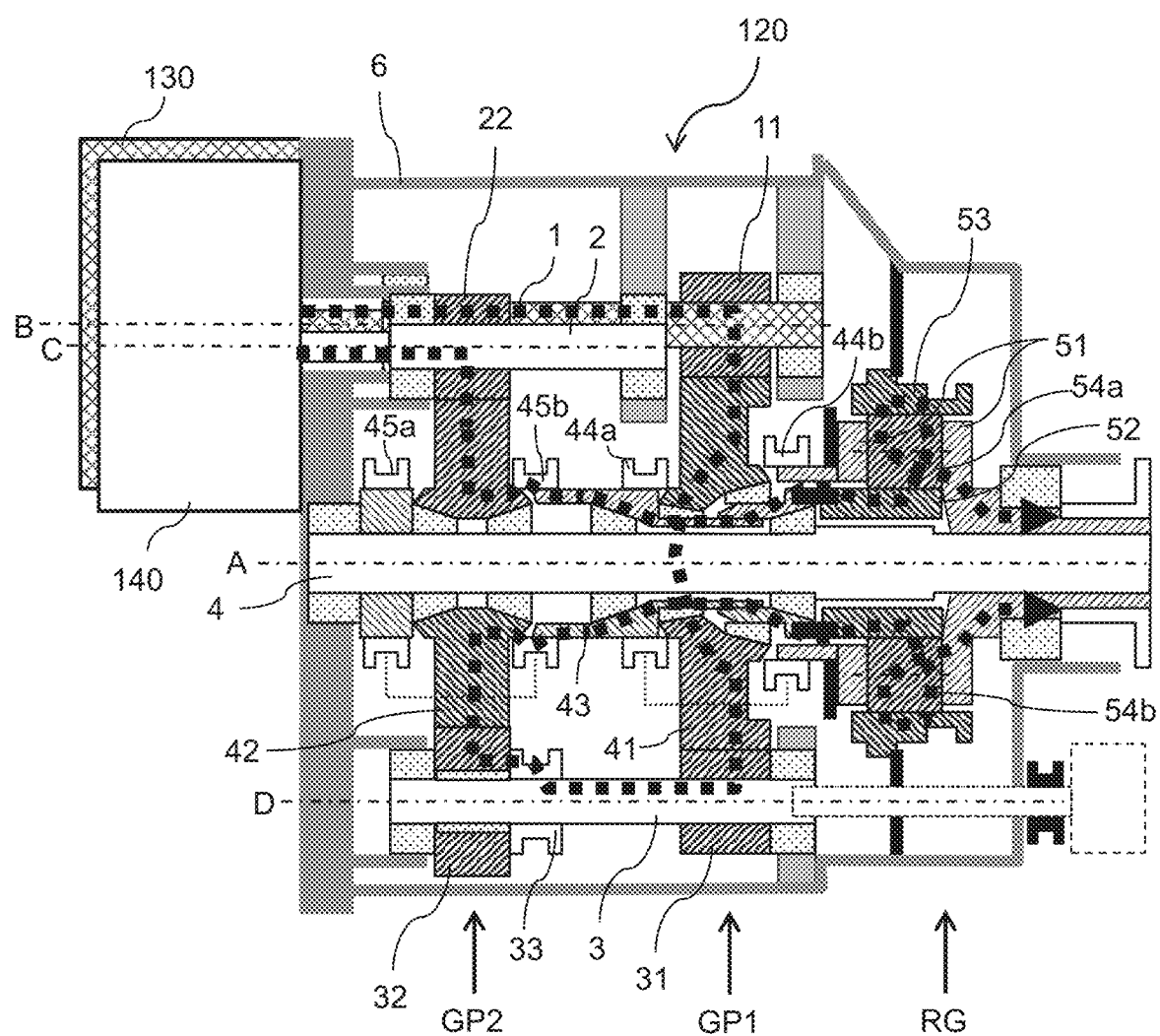
FIG. 5 illustrates power flow through the transmission in FIG. 2 in a third state.

FIG. 5 shows the transmission in a configuration with the second countershaft gearwheel 32 rotationally connected to the countershaft 3 by means of the countershaft gear engaging device 33, the first gear engaging device 44a, 44b set to the first gear engaging device neutral state, the second gear engaging device 45a, 45b set to the second gear engaging device first state, and the range gear RG set to the low range gear. Power is transferred from the first electric machine 130 to the output shaft 4 in a winding power flow via the countershaft 3, using both the first gear plane GP1 and the second gear plane GP2. Power from the second electric machine 140 is transferred via the second gear plane GP2 to the main shaft 43 and thereby to the range gear RG.

Figure 6:
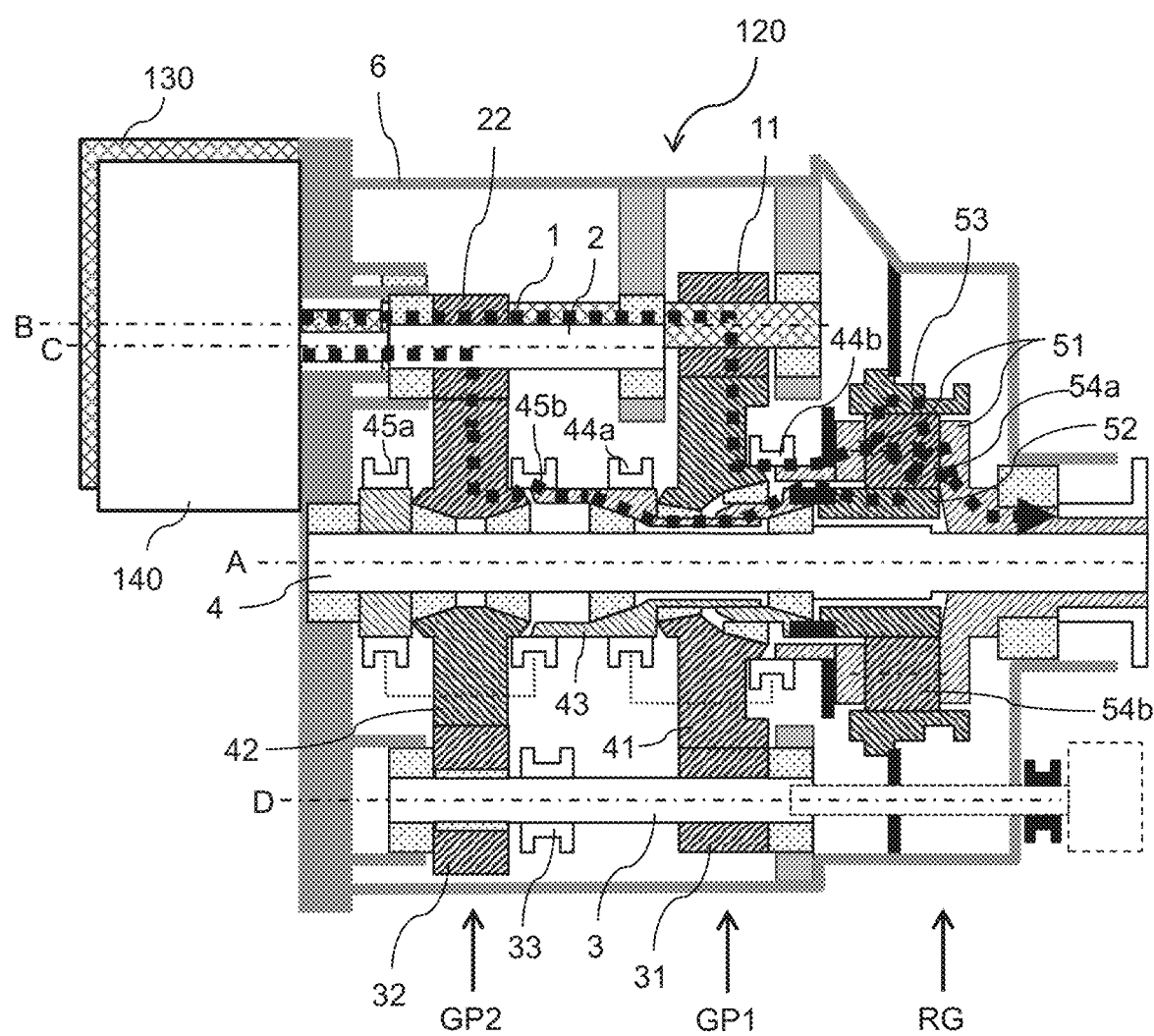
FIG. 6 illustrates power flow through the transmission in FIG. 2 in a fourth state.

When the vehicle speed is further increased, the countershaft gear engaging device 33 is again disengaged to interrupt torque transfer between the first electric machine 130 and the output shaft 4, while the vehicle 100 is driven using the second electric machine 140. As shown in FIG. 6, the first gear engaging device 44a, 44b is thereafter shifted to the first gear engaging device first state, with the second gear engaging device 45a, 45b remaining set to the second gear engaging device first state, the countershaft gear engaging device 33 disengaged, and the range gear RG set to the low range gear. Power is now transferred from the first electric machine 130 to the output shaft 4 via the first gear plane GP1 and directly to the planetary gearwheel carrier 51, without using the countershaft 3. Power from the second electric machine 140 is transferred via the second gear plane GP2 to the main shaft 43 and thereby to the sun gearwheel 52, without using the countershaft 3.

Figure 7:
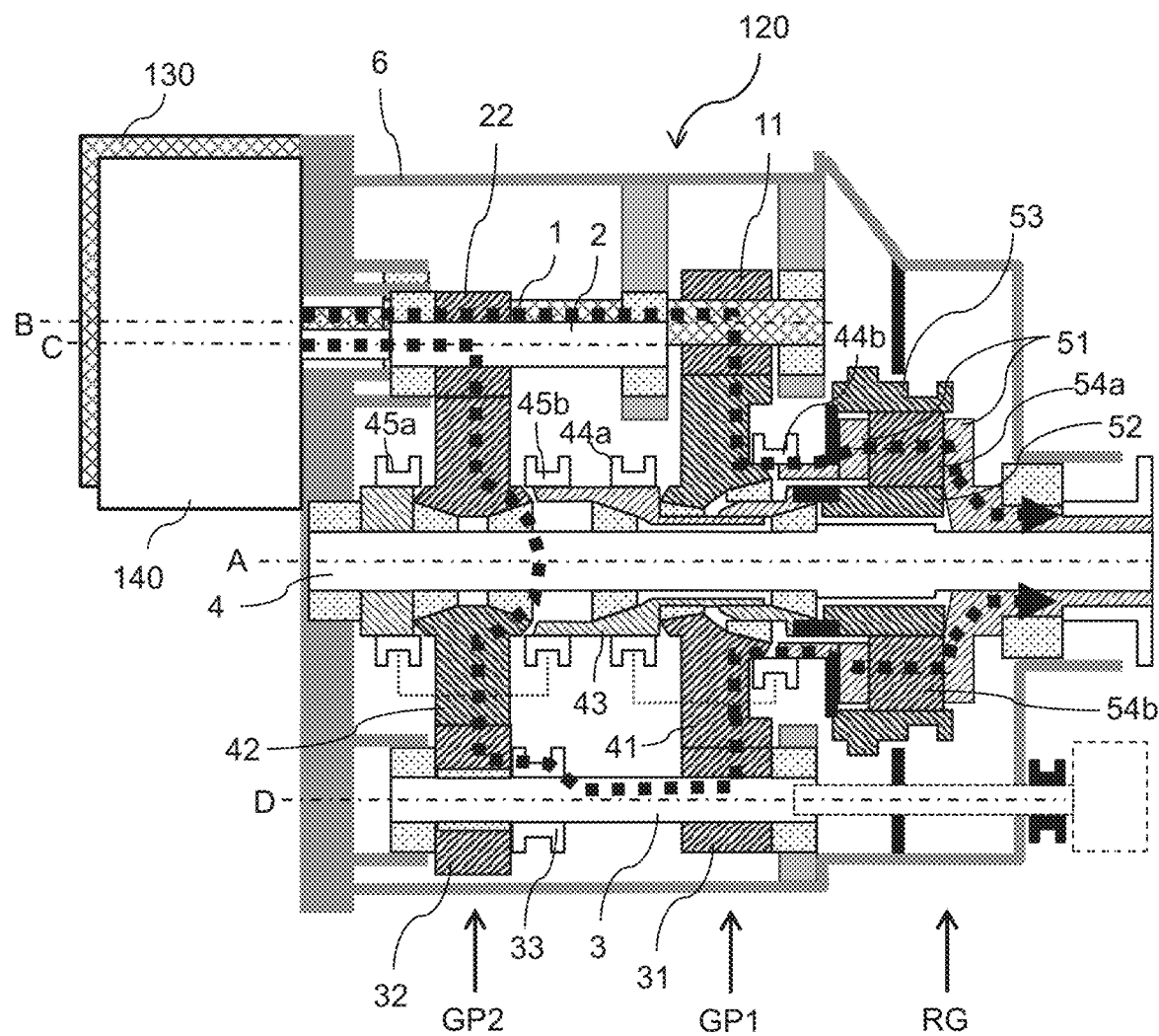
FIG. 7 illustrates power flow through the transmission in FIG. 2 in a fifth state.

To further increase the vehicle speed, a shift to the high range gear is desirable. With power from the first electric machine 130 being transmitted via the planetary gearwheel carrier to the output shaft 4, torque transfer from the second electric machine 140 via the sun gearwheel 52 is interrupted by shifting the second gear engaging device 45a, 45b to the second gear engaging device neutral state. The ring gearwheel 53 is thereafter released from the transmission housing 6 and rotationally connected to the planetary gearwheel carrier 51, while the countershaft gear engaging device 33 remains disengaged. Thereafter, the countershaft gear engaging device 33 is engaged to allow a power flow from the second electric machine 140 via the countershaft 3, as illustrated in FIG. 7.

Figure 8:
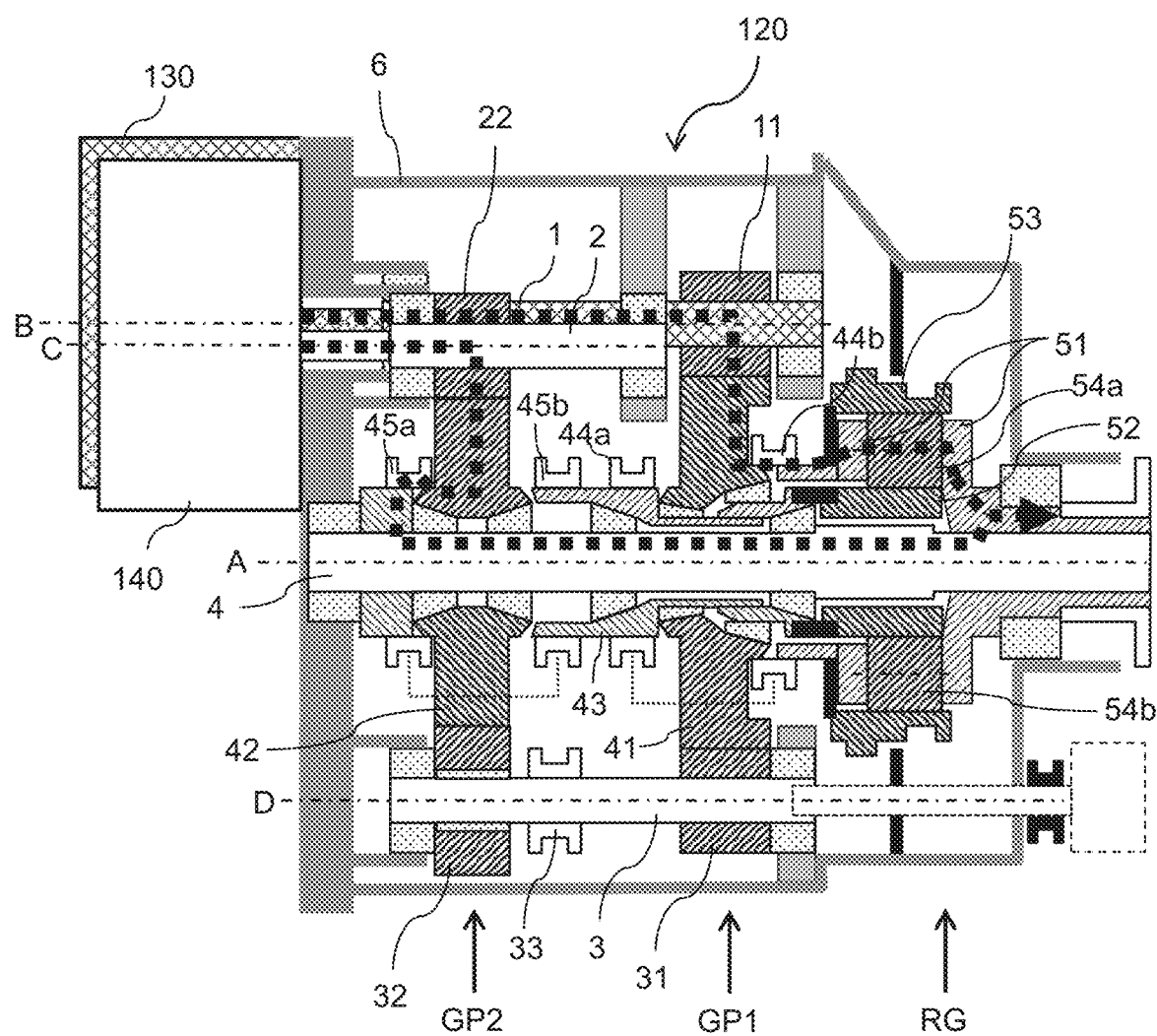
FIG. 8 illustrates power flow through the transmission in FIG. 2 in a sixth state.

To shift to a higher gear, the countershaft gear engaging device 33 is again disengaged to interrupt power flow from the second electric machine 140 and drive the vehicle 100 using solely the first electric machine 130. The second gear engaging device 45a, 45b is thereafter shifted to the second gear engaging device second state, whereby torque from the second electric machine 140 is transferred from the second main gearwheel 42 to the output shaft 4, which is rotationally connected to the second main gearwheel 42 by means of the sleeve member 45a. The sun gearwheel 52 is thus not used for torque transfer in this configuration, and neither is the countershaft 3. This configuration is illustrated in FIG. 8.

Figure 9:
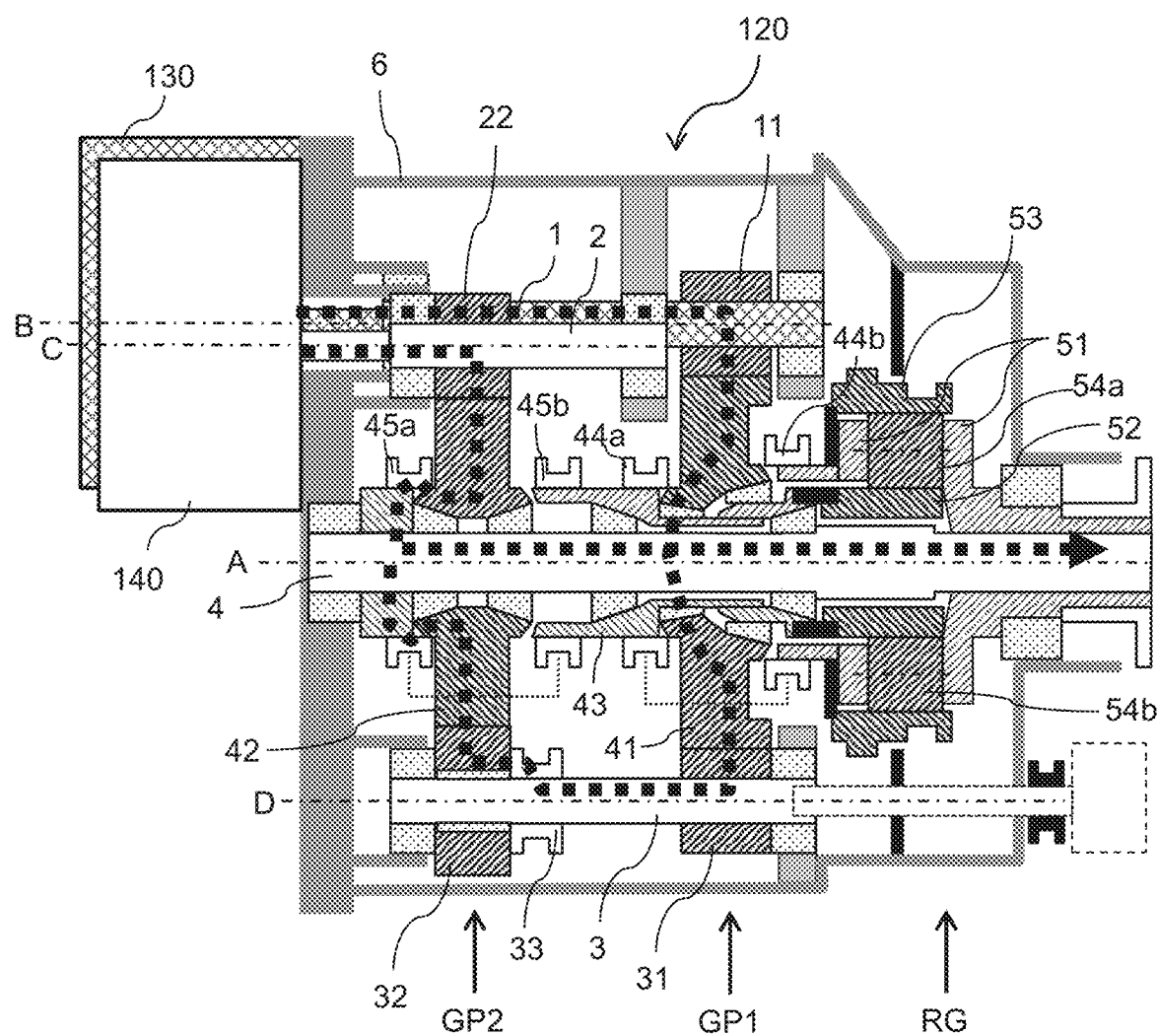
FIG. 9 illustrates power flow through the transmission in FIG. 2 in a seventh state, FIG. 10 schematically illustrates power flow through the transmission in FIG. 2 in a mode of operation, FIG. 11 schematically illustrates a transmission according to a second embodiment of the present disclosure, FIG. 12 schematically illustrates a transmission according to a third embodiment of the present disclosure, and FIG. 13 schematically illustrates a transmission according to a fourth embodiment of the invention.

To further increase the vehicle speed, the first gear engaging device 44a, 44b is shifted to the first gear engaging device neutral state to interrupt torque transfer from the first electric machine 130 to the output shaft 4. While using solely the second electric machine 140 to drive the vehicle 100, the countershaft gear engaging device 33 is re-engaged. Both electric machines 130, 140 may now again be used for propelling the vehicle 100, as illustrated in FIG. 9. Power from both electric machines 130, 140 is transferred to the output shaft 4 via the sleeve member 45a in the second gear plane GP2.

Figure 10:
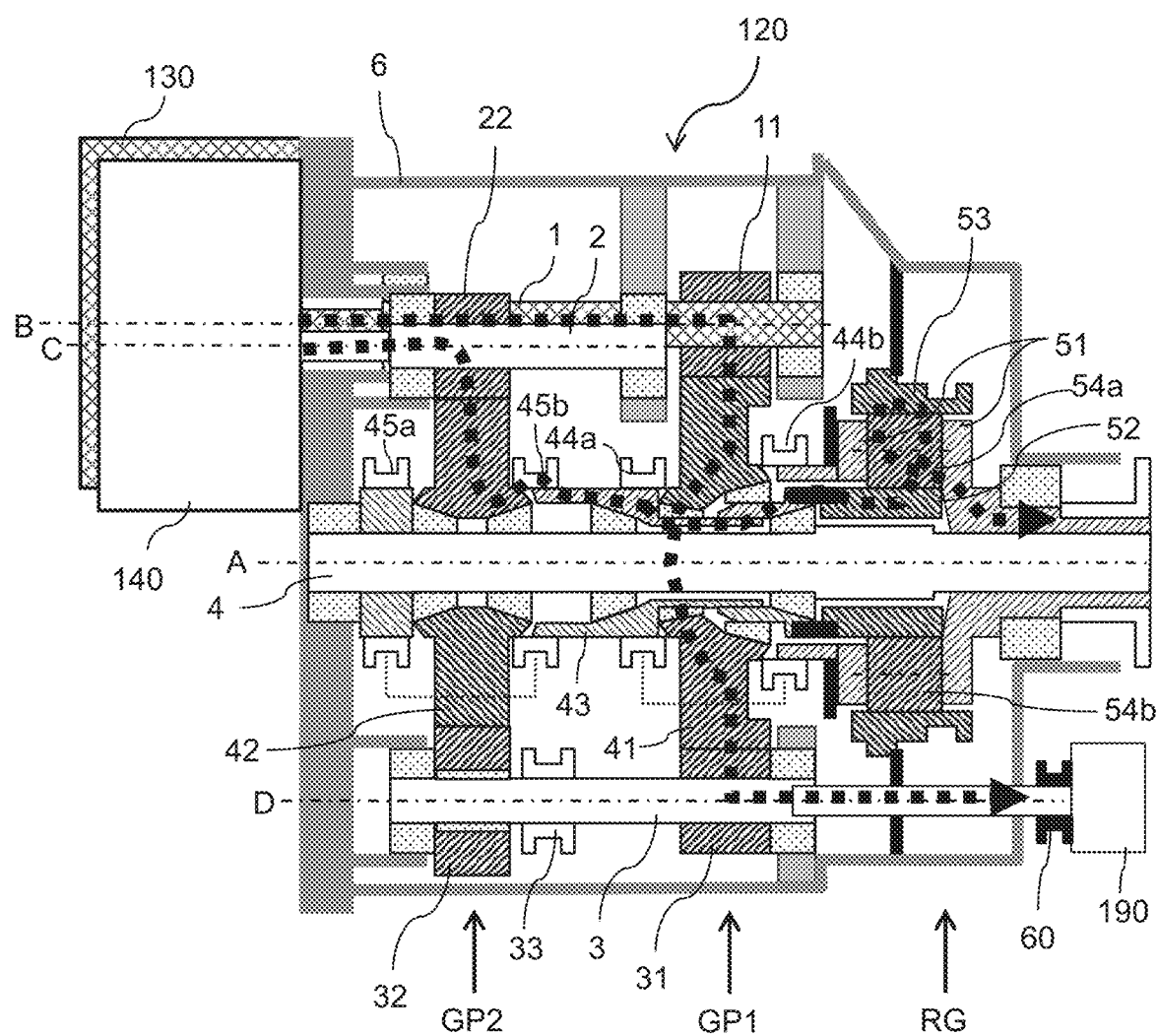

As illustrated in FIG. 10, the transmission 120 may, in a PTO mode of operation, also be used for driving the PTO device 190 using power from the first electric machine 130 while the second electric machine 140 is used for propulsion of the vehicle 100. The range gear RG is herein set to the low range gear, the first gear engaging device 44a, 44b is set to the first gear engaging device neutral state, the second gear engaging device 45a, 45b is set to the second gear engaging device first state, and the countershaft gear engaging device 33 is disengaged. The clutch 60 engages the PTO device so that it is driven by the countershaft 3, in turn driven by the first electric machine 130 via the gearwheels of the first gear plane GP1. No parts of the powertrain 110 are in this mode of operation drivingly connected to both of the first and second power units 130, 140. It is also possible to drive the PTO device 190 independently of the vehicle speed by setting both the first and the second gear engaging devices 44a, 44b, 45a, 45b to their neutral states and by engaging the countershaft gear engaging device 33 and the clutch 60. In this way, none of the power units 130, 140 is used for propulsion of the vehicle 100. Of course, it is also possible to drive the PTO device 190 in other modes of operation in which the countershaft 3 is used for transmitting torque from either one of the electric machines 130, 140 to the output shaft 4, by engaging the clutch 60. In such cases, the PTO device 190 is not driven independently from the vehicle speed.

Figure 11:
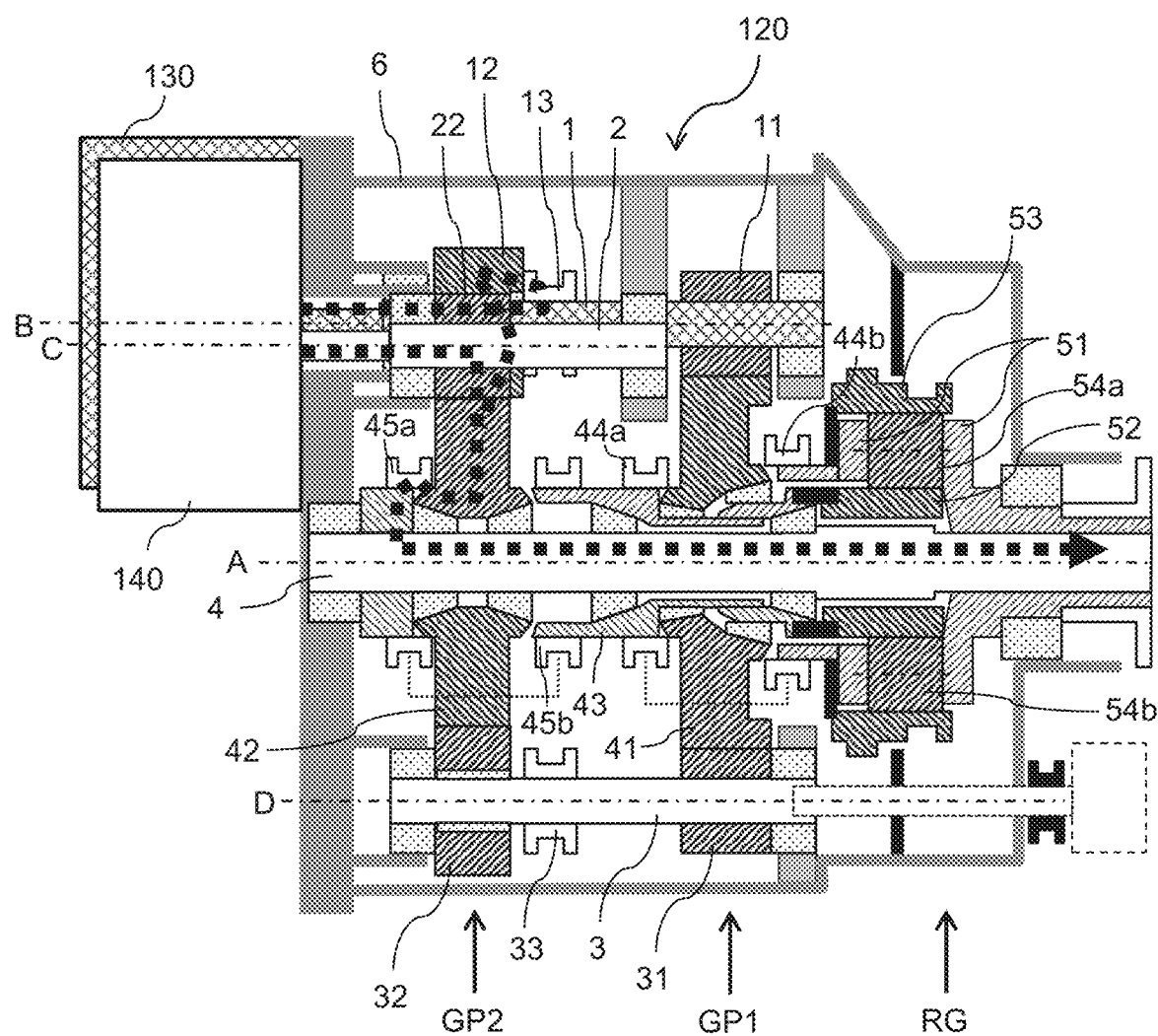

A transmission 120 according to a second embodiment is illustrated in FIG. 11. The transmission 120 only differs from the first embodiment in that it comprises a first input shaft second gearwheel 12 located in the second gear plane GP2, and a third gear engaging device 13 comprising a sleeve member. The first input shaft second gearwheel 12 is rotatably arranged on the first input shaft 1 and the third gear engaging device 13 is arranged for selectively rotationally connecting the first input shaft second gearwheel 12 to the first input shaft 1 in an engaged state of the third gear engaging device 13. The first input shaft second gearwheel 12 is herein arranged in meshing engagement with the second main gearwheel 42. In FIG. 11, torque transmission using this first input shaft second gearwheel 12 is shown when the vehicle 100 is driven at a high vehicle speed, similar to the configuration shown in FIG. 9. The difference between the configuration shown in FIG. 9 and the one shown in FIG. 11 is that, in FIG. 9, the countershaft gear engaging device 33 is engaged to enable a winding power flow, while in FIG. 11, the countershaft gear engaging device 33 is disengaged and the third gear engaging device 13 is engaged. The engagement of the third gear engaging device 13 enables a power flow from the first electric machine 130 to the output shaft 4 via the second gear plane GP2, without using the countershaft 3.

In some embodiments, it is possible to provide a common actuator (not shown) for actuating the third gear engaging device 13 and the countershaft gear engaging device 33, wherein the transmission 120 is configured so that the third gear engaging device 13 is engaged when the countershaft gear engaging device is disengaged, and vice versa. A neutral position in which both the countershaft gear engaging device 33 and the third gear engaging device 13 are disengaged should also be provided.

Figure 12:
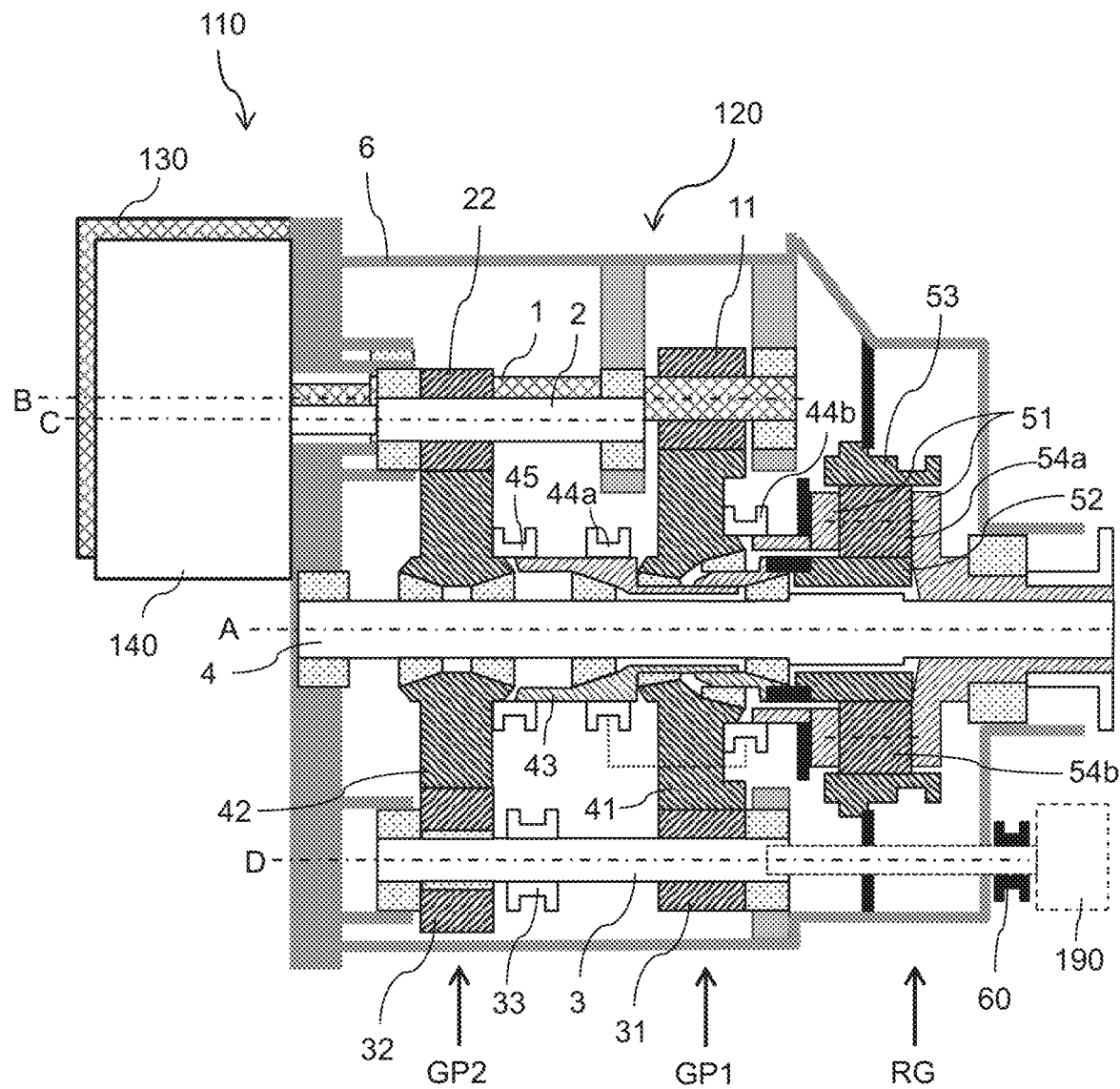

FIG. 12 illustrates a transmission 120 according to a third embodiment. The transmission 120 differs from the first embodiment in the configuration of the second gear plane GP2. The second gear engaging device 45 herein comprises a single sleeve member, and the second gear engaging device 45 is only selectively settable to one of two states: the second gear engaging device first state, in which it rotationally connects the second main gearwheel 42 to the main shaft 43, and the second gear engaging device neutral state. Thus, the second gear engaging device 45 can in this embodiment not be used to rotationally connect the second main gearwheel 42 to the output shaft 4.

Figure 13:
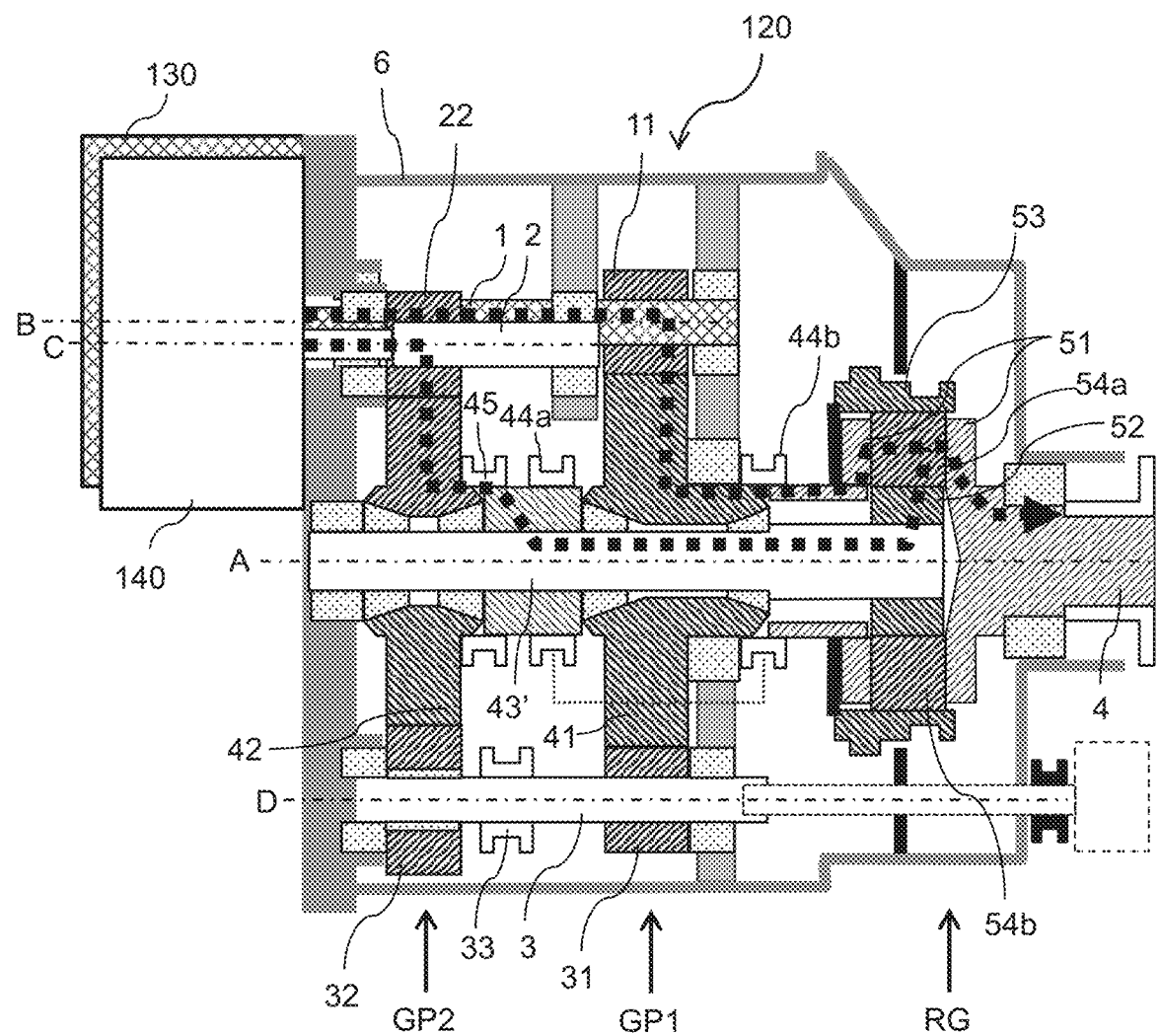

FIG. 13 illustrates a transmission 120 according to a fourth embodiment. The transmission 120 differs from the third embodiment in that, instead of being a hollow main shaft 43, the main shaft 43' is herein a solid shaft. The main shaft 43' and the output shaft 4 are arranged in a row along a common longitudinal axis A, with the range gear RG connecting the two shafts 43', 4. The second main gearwheel 42 is herein rotatably arranged on the main shaft 43', bearings being provided between the second main gearwheel 42 and the main shaft 43', as well as between the first main gearwheel 41 and the main shaft 43'. In similar with the third embodiment, the second gear engaging device 45 comprises a single sleeve member, and the second gear engaging device 45 is only selectively settable to one of the second gear engaging device first state and the second gear engaging device neutral state. In the gear configuration shown in FIG. 13, the second gear engaging device 45 is set to the second gear engaging device first state, and the first gear engaging device 44a, 44b is set to the first gear engaging device first state. The countershaft gear engaging device 33 is disengaged, so there is no torque transmission via the countershaft 3. The range gear RG is set to the high range gear. The dotted arrows illustrate the power flows from the first and second electric machines 130, 140 to the output shaft 4.

Although not illustrated in the drawings, a retarder may in all embodiments be connected to the output shaft 4 for further providing an auxiliary brake torque.

A method for controlling the powertrain 110 in the PTO mode of operation, such as illustrated in FIG. 10 for the first embodiment, may comprise the following steps:

S1: Controlling the first gear engaging device 44a, 44b to the first gear engaging device neutral state, the second gear engaging device 45a, 45b to the second gear engaging device first state or the second gear engaging device second state, the countershaft gear engaging device 33 to the disengaged state, and the clutch 60 to the engaged state, thereby obtaining the PTO mode of operation of the transmission 120.

S2: Controlling the first power unit 130 to a first rotational speed or torque as requested for driving the power take-off device 190.

S3: Controlling the second power unit 140 to a second rotational speed or torque as requested for driving the propeller shaft 160.

An electronic powertrain control device (not shown) may be provided for controlling the powertrain 110 and for carrying out the method. The powertrain control device may for this purpose comprise means for controlling the first power unit 130, means for controlling the second power unit 140, and means for controlling the transmission 120, including at least the gear engaging devices 44a, 44b, 45a, 45b, 33, and the clutch 60. The powertrain control device may be configured to control the power units 130, 140 and the transmission 120 in dependence on a first torque request for driving the propeller shaft 160 and a second torque request for driving the PTO device 190.

The powertrain control device may include a microprocessor, a microcontroller, a programmable digital signal processor or another programmable device. Thus, the powertrain control device comprises electronic circuits and connections (not shown) as well as processing circuitry (not shown) such that the powertrain control device can communicate with different parts of the vehicle 100 or with different control units of the vehicle 100, such as with various sensors, systems and control units, in particular with one or more electronic control units (ECUs) controlling electrical systems or subsystems in the vehicle 100, such as an energy storage system control unit of an electric energy storage system (not shown) of the vehicle 100. The powertrain control device may comprise modules in either hardware or software, or partially in hardware or software, and communicate using known transmission buses such a CAN-bus and/or wireless communication capabilities. The processing circuitry may be a general-purpose processor or a specific processor. The powertrain control device may comprise a non-transitory memory for storing computer program code and data. Thus, the skilled person realizes that the powertrain control device may be embodied by many different constructions. Although herein illustrated as a single unit, the powertrain control device may be formed of several different control units configured to communicate with each other, such as separate control units for controlling the power units 130, 140 and for controlling the transmission 120.

It is to be understood that the present invention is not limited to the embodiments described above and illustrated in the drawings; rather, the skilled person will recognize that many changes and modifications may be made within the scope of the appended claims.

The invention claimed is:

1. A transmission for a vehicle, comprising:
   a first input shaft, a second input shaft, a countershaft, a main shaft, and an output shaft,
   a first gear plane comprising a first input shaft gearwheel arranged on the first input shaft, a first main gearwheel rotatably arranged on the main shaft, and a first countershaft gearwheel arranged on the countershaft, the gearwheels of the first gearwheel plane being arranged in mutual driving connection,
   a second gear plane comprising a second input shaft gearwheel arranged on the second input shaft, a second main gearwheel rotatably arranged on the main shaft or on the output shaft, and a second countershaft gearwheel arranged on the countershaft, the first countershaft gearwheel being selectively drivingly connectable to the second countershaft gearwheel, the gearwheels of the second gearwheel plane being arranged in mutual driving connection,
   a range gear selectively settable to a high range gear or a low range gear, the range gear comprising at least a first, a second and a third range gear component, the first range gear component being rotationally connected to the output shaft,
   a first gear engaging device selectively settable to:
      a first gear engaging device first state in which it drivingly connects the first main gearwheel to the first range gear component,
      a first gear engaging device neutral state, and
      a first gear engaging device second state in which it drivingly connects the first main gearwheel to the second range gear component,
   a second gear engaging device selectively settable to at least:
      a second gear engaging device first state in which it drivingly connects the second main gearwheel to the second range gear component, and
      a second gear engaging device neutral state.

2. The transmission according to claim 1, wherein the second main gearwheel is rotatably arranged on the output shaft, and wherein the second gear engaging device is further selectively settable to a second gear engaging device second state in which it rotationally connects the second main gearwheel to the output shaft.

3. The transmission according to claim 1, wherein the main shaft is a hollow shaft being rotatably arranged on and coaxial with the output shaft.

4. The transmission according to claim 1, wherein the second main gearwheel is rotatably arranged on the main shaft, the main shaft and the output shaft being arranged in a row along a common longitudinal axis.

5. The transmission according to claim 1, wherein the range gear comprises a planetary gear set.

6. The transmission according to claim 1, further comprising a range gear selector configured to set the range gear to the low range gear by locking the third range gear component to a transmission housing, and to set the range gear to the high range gear by rotationally connecting at least two of the first, second and third range gear components.

7. The transmission according to claim 6 wherein the range gear comprises a planetary gear set and wherein the third range gear component is a ring gearwheel of the planetary gear set.

8. The transmission according to claim 1, further comprising a countershaft gear engaging device for selectively rotationally connecting the second countershaft gearwheel to the countershaft, thereby selectively drivingly connecting the first countershaft gearwheel to the second countershaft gearwheel.

9. The transmission according to claim 1, wherein the first input shaft gearwheel and the first main gearwheel of the first gear plane provide a larger gear ratio than the second input shaft gearwheel and the second main gearwheel of the second gear plane.

10. The transmission according to claim 1, wherein the first main gearwheel is arranged in meshing engagement with each one of the first input shaft gearwheel and the first countershaft gearwheel, and wherein the second main gearwheel is arranged in meshing engagement with each one of the second input shaft gearwheel and the first countershaft gearwheel.

11. The transmission according to claim 1, wherein the main shaft is rotationally fixed to the second range gear component.

12. The transmission according to claim 1, wherein the second gear engaging device is configured to drivingly connect the second main gearwheel to the main shaft in the second gear engaging device first state.

13. The transmission according to claim 1, wherein the first gear engaging device is configured to drivingly connect the first main gearwheel to the main shaft in the first gear engaging device second state.

14. The transmission according to claim 1, wherein the second gear plane further comprises a first input shaft second gearwheel rotatably arranged on the first input shaft and wherein the transmission further comprises a third gear engaging device for selectively rotationally connecting the first input shaft second gearwheel to the first input shaft.

15. A powertrain comprising a first power unit, a second power unit and the transmission according to claim 1, wherein the first input shaft of the transmission is drivingly connected to the first power unit and wherein the second input shaft of the transmission is drivingly connected to the second power unit.

16. A powertrain according to claim 15, wherein at least one of the first power unit and the second power unit is an electric machine.

17. The powertrain according to claim 15, further comprising a power take-off device drivingly connected or connectable to the countershaft.

18. A vehicle comprising the powertrain according to claim 15.

* * * * *